United States Patent
Lin et al.

(10) Patent No.: US 10,157,343 B1
(45) Date of Patent: *Dec. 18, 2018

(54) PREDICTIVE MODEL IMPORTATION

(71) Applicant: Google LLC, Mountain View, CA (US)

(72) Inventors: Wei-Hao Lin, New York, NY (US); Travis H. K. Green, New York, NY (US); Robert Kaplow, New York, NY (US); Gang Fu, Kearny, NJ (US); Gideon S. Mann, New York, NY (US)

(73) Assignee: Google LLC, Mountain View, CA (US)

( * ) Notice: Subject to any disclaimer, the term of this patent is extended or adjusted under 35 U.S.C. 154(b) by 653 days.

This patent is subject to a terminal disclaimer.

(21) Appl. No.: 14/740,942

(22) Filed: Jun. 16, 2015

Related U.S. Application Data

(63) Continuation of application No. 14/047,576, filed on Oct. 7, 2013, now Pat. No. 9,070,089, which is a continuation of application No. 13/482,196, filed on May 29, 2012, now Pat. No. 8,583,576, which is a continuation of application No. 13/277,052, filed on Oct. 19, 2011, now Pat. No. 8,209,274.

(60) Provisional application No. 61/484,157, filed on May 9, 2011.

(51) Int. Cl.
*G06N 5/04* (2006.01)
*G06N 99/00* (2010.01)
*H04L 29/08* (2006.01)

(52) U.S. Cl.
CPC .......... *G06N 5/04* (2013.01); *G06N 99/005* (2013.01); *H04L 67/10* (2013.01)

(58) Field of Classification Search
USPC ......................................................... 706/49
See application file for complete search history.

(56) References Cited

U.S. PATENT DOCUMENTS

| | | | | |
|---|---|---|---|---|
| 5,692,107 | A * | 11/1997 | Simoudis | G06N 5/025 706/12 |
| 6,266,053 | B1 * | 7/2001 | French | G06T 17/005 345/440 |
| 6,393,386 | B1 * | 5/2002 | Zager | H04L 41/0233 370/254 |
| 7,349,919 | B2 | 3/2008 | Russell et al. | |
| 7,565,304 | B2 | 7/2009 | Casati et al. | |
| 7,577,554 | B2 * | 8/2009 | Lystad | G06Q 10/06312 703/2 |
| 7,590,589 | B2 | 9/2009 | Hoffberg | |

(Continued)

OTHER PUBLICATIONS

IEEE Transactions on Knowledge and Data Engineering, vol. XX, No. XX, Sep. 1, 2017 A Comprehensive Survey of Graph Embedding: Problems, Techniques and Applications Hongyun Cai, Vincent W. Zheng, and Kevin Chen-Chuan Chang pp. 1-20.*

(Continued)

*Primary Examiner* — Michael B Holmes
(74) *Attorney, Agent, or Firm* — Fish & Richardson P.C.

(57) ABSTRACT

Methods, systems, and apparatus, including computer programs encoded on a computer storage medium, for obtaining a plurality of model representations of predictive models, each model representation associated with a respective user and expresses a respective predictive model, and selecting a model implementation for each of the model representations based on one or more system usage properties associated with the user associated with the corresponding model representation.

22 Claims, 5 Drawing Sheets

(56) References Cited

U.S. PATENT DOCUMENTS

| | | | |
|---|---|---|---|
| 7,606,924 B2 | 10/2009 | Raz et al. | |
| 7,668,740 B1 | 2/2010 | Baggett et al. | |
| 7,686,214 B1* | 3/2010 | Shao | G06Q 20/382 235/380 |
| 7,813,870 B2 | 10/2010 | Downs et al. | |
| 7,899,611 B2 | 3/2011 | Downs et al. | |
| 7,912,628 B2 | 3/2011 | Chapman et al. | |
| 7,930,266 B2 | 4/2011 | Tuv et al. | |
| 7,970,721 B2 | 6/2011 | Leskovec et al. | |
| 7,979,365 B2 | 7/2011 | Goldberg et al. | |
| 8,027,854 B2 | 9/2011 | Baggett et al. | |
| 8,065,073 B2 | 11/2011 | Downs et al. | |
| 8,090,524 B2 | 1/2012 | Chapman et al. | |
| 8,209,274 B1* | 6/2012 | Lin | G06N 3/08 706/21 |
| 8,229,864 B1 | 7/2012 | Lin et al. | |
| 8,244,651 B1 | 8/2012 | Lin et al. | |
| 8,244,654 B1 | 8/2012 | Hobgood et al. | |
| 8,250,009 B1 | 8/2012 | Breckenridge et al. | |
| 8,301,498 B1 | 10/2012 | Cortes et al. | |
| 8,311,967 B1 | 11/2012 | Lin et al. | |
| 8,312,056 B1* | 11/2012 | Peng | G06Q 50/01 705/319 |
| 8,364,613 B1 | 1/2013 | Lin et al. | |
| 8,370,279 B1 | 2/2013 | Lin et al. | |
| 8,370,280 B1* | 2/2013 | Lin | G06N 99/005 706/12 |
| 8,438,122 B1 | 5/2013 | Mann et al. | |
| 8,443,013 B1 | 5/2013 | Lin et al. | |
| 8,473,431 B1 | 6/2013 | Mann et al. | |
| 8,489,632 B1 | 7/2013 | Breckenridge et al. | |
| 8,521,664 B1 | 8/2013 | Lin et al. | |
| 8,533,222 B2 | 9/2013 | Breckenridge et al. | |
| 8,533,224 B2 | 9/2013 | Lin et al. | |
| 8,554,703 B1 | 10/2013 | Lin et al. | |
| 8,583,576 B1* | 11/2013 | Lin | G06N 3/08 706/21 |
| 8,595,154 B2 | 11/2013 | Breckenridge et al. | |
| 8,606,728 B1 | 12/2013 | Lin et al. | |
| 8,626,791 B1 | 1/2014 | Lin et al. | |
| 8,694,540 B1 | 4/2014 | Lin et al. | |
| 8,706,656 B1 | 4/2014 | Lin et al. | |
| 8,706,659 B1 | 4/2014 | Mann et al. | |
| 8,762,299 B1 | 6/2014 | Breckenridge et al. | |
| 8,843,427 B1 | 9/2014 | Lin et al. | |
| 8,868,472 B1 | 10/2014 | Lin et al. | |
| 8,909,564 B1 | 12/2014 | Kaplow et al. | |
| 8,909,568 B1 | 12/2014 | Mann et al. | |
| 9,070,089 B1* | 6/2015 | Lin | G06N 3/08 |
| 2002/0032697 A1* | 3/2002 | French | G06T 17/005 715/211 |
| 2003/0212851 A1 | 11/2003 | Drescher et al. | |
| 2005/0125213 A1* | 6/2005 | Chen | G06F 11/3414 703/22 |
| 2005/0234753 A1 | 10/2005 | Pinto et al. | |
| 2005/0243736 A1* | 11/2005 | Faloutsos | G06Q 10/04 370/254 |
| 2006/0149674 A1* | 7/2006 | Cook | G06O 20/40 705/44 |
| 2007/0022000 A1* | 1/2007 | Bodart | G06Q 10/0639 705/7.38 |
| 2009/0106178 A1 | 4/2009 | Chu | |
| 2012/0066166 A1* | 3/2012 | Curbera | G06N 7/005 706/52 |

OTHER PUBLICATIONS

Learning Edge Representations via Low-Rank Asymmetric Projections Sami Abu-El-Haija, Google Research Bryan Perozzi, Google Research, Rami Al-Rfou, Google Research, ACM pp. 1-10.*
Chandra, Tushar, "Sibyl: a system for large scale machine learning" Keynote I PowerPoint presentation, Jul. 28, 2010, ladisworkshop. org [online]. [Retrieved on Jan. 25, 2011]. Retrieved from the Internet: <URL: http://ladisworkshop.org/sites/default/files/LADIS% 202010%20actual.pdf>, 43 pages.
Duchi, John, et al., "Boosting with Structural Sparsity", 2009, cs.berkeley.edu [online]. [Retrieved on Jan. 25, 2011]. Retrieved from the Internet: <URL: http://www.cs.berkeley.edu/~jduchi/projects/DuchiSi09d.pdf>, 41 pages.
Duchi, John, et al., "Boosting with Structural Sparsity", Proceedings of the 26th International Conference on Machine Learning, Montreal, Canada, 2009, cs.berkeley.edu [online]. [Retrieved on Jan. 25, 2011]. Retrieved from the Internet: <URL: http://www.cs.berkeley.edu/~jduchi/projects/DuchiSi09a.pdf>, 8 pages.
R-Project web pages, 190 pages [online]. May 2010. Publically available before Aug. 12, 2011. [Retrieved on May 18, 2010]. Retrieved from the Internet: <URL: http://www.r-project.org/>, 190 pages.
Uclassify web pages, [online]. Oct. 2009-Apr. 2010. Publically available before Aug. 12, 2011. [Retrieved on May 18, 2010] Retrieved from the Internet: <URL: http://www.uclassify.com/>, 16 pages.
Zementis web pages [online]. Jun. 2009. Publically available before Aug. 12, 2011. [Retrieved on May 18, 2010] Retrieved from the Internet: <URL: http://www.zementis.com/>, 34 pages.
Delany, et al., Generating Estimates of Classification Confidence for a Case-Based Spam Filter; 2005; Springer-Vergal Berlin Heidelberg; Lecture Notes in Computer Science, 2005, vol. 3620, pp. 177-190.
Dag Consistent Parallel Simpulation: A Predictable and Robust Conservative Algorithm, Wenton Cai et al.; Parallel and Distributed Simulation, 1997; Proceedings, 11th Workshop on Digital Object Identifier; 10.1109/PADS.1997.594604; pp. 178-181.
Stochastic Models for the Web Graph, Kumar, R. et al.; Foundations of Computer Science, 2000; Proceedings, 41st Annual Symposium on Digital Object Identifier; 11.1109/SFCS.2000.892065; pp. 57-65.
Explicit Modeling of Mode Transition Constraints for Model Predictive Control, Kobayashi, K. et al.; SICE Annual Conference, 2008 Digital Object Identifier: 10.1109/SICE.2008.4654911; pp. 1569-1574.
Research on Prediction Technique of Network Situation Awareness, Wang, et al.; Cybernetics and Intelligent Systems, 2008 IEEE Conference on Digital Object Identifier: 10.1109/ICCIS.2008. 4670783; pp. 570-574.
Evaluating Predictive Models, 36-350, Data Mining, Principles of Data Mining, Chapter 7; Berk chapter 2, Oct. 26 and 28, 2001, 22 pages.
Weiss, Integrating Real-Time Predictive Analytics into SAP Applications [online], Dec. 30, 2009 [retrieved on Sep. 29, 2011], Retrieved from the Internet: ,URL:http://www.sdn.sap.com/irj/sen/go/portal/prtroot/docs/library/uuid/a07faefd-61d7-2c10-bba6-89ac5ffc302c?QuickLink=index&overridelayout=true>, 1 page.
Hutter, et al., "Performance Prediction and Automated Tuning of Randomized and Parametric Algorithms,", Principles and Practice of Constraint Programming, Lecture Notes in Computer Science, 2006, 15 pages.
SAS Rapid Predictive Modeler, Overview, Dec. 2010, Publically available before Aug. 12, 2011. 4 pages.
Postema, et al., "A Decision Support Tool for Tuning Parameters in a Machine Learning Algorithm", Nanyang Technological University, 1997, 9 pages.
"Active learning (machine learning)," Wikipedia, the free encyclopedia, [online] Aug. 26, 2011, [retrieved on Aug. 8, 2011]. Retrieved from the Internet: http://en.wikipedia.org/wiki/Active learning (machine learning), 3 pages.
A differential flatness based model predictive control approach Kandler, C. ; Ding, S.X. ; Koenings, T. ; Weinhold, N. ; Schultalbers, M. Control Applications (CCA), 2012 IEEE International Conference on DOI: 10.1109/CCA.2012.6402435 Publication Year: 2012, pp. 1411-1416.
Model predictive control formulation for a class of time-varying linear parabolic PDEs Ng, J. ; Aksikas, I. ; Dubljevic, S. American Control Conference (ACC), 2011 DOI: 10.1109/ACC.2011. 5991009 Publication Year: 2011, pp. 2963-2968.
An efficient nonlinear model-predictive eco-cruise control for electric vehicles Schwickart, T. ; Voos, H. ; Hadji-Minaglou, J.-R.; Darouach, M. Industrial Informatics (INDIN), 2013 11th IEEE

(56) References Cited

OTHER PUBLICATIONS

International Conference on DOI: 10.1109/INDIN.2013.6622901 Publication Year: 2013, pp. 311-316.

Planning with predictive state representations James, M.R. ; Singh, S.; Littman, M.L. Machine Learning and Applications, 2004. Proceedings. 2004 International Conference on DOI: 10.1109/ICMLA.2004.1383528 Publication Year: 2004, pp. 304-311.

* cited by examiner

PREDICTIVE MODEL IMPORTATION

CROSS-REFERENCE TO RELATED APPLICATIONS

This application is a continuation of and claims priority under 35 U.S.C. § 120 to U.S. patent application Ser. No. 14/047,576, filed on Oct. 7, 2013, now U.S. Pat. No. 9,070,089, which is a continuation of U.S. patent application Ser. No. 13/482,196, filed on May 29, 2012, now U.S. Pat. No. 8,583,576, which is a continuation of U.S. patent application Ser. No. 13/277,052, filed on Oct. 19, 2011, now U.S. Pat. No. 8,209,274, which claims the benefit under 35 U.S.C. § 119(e) of the filing date of U.S. Patent Application No. 61/484,157, filed on May 9, 2011. The entire contents of each of the foregoing applications are incorporated herein by reference.

BACKGROUND

This specification relates to importation and use of predictive models.

Predictive modeling generally refers to techniques for extracting information from data to build a model that can predict an output from a given input. Predicting an output can include predicting future trends or behavior patterns, or performing sentiment analysis, to name a few examples. Various types of predictive models can be used to analyze data and generate predictive outputs. Examples of predictive models include Naive Bayes classifiers, k-nearest neighbor classifiers, support vector machines, and logistic regression techniques, for example. Typically, a predictive model is trained with training data that includes input data and output data that mirror the form of input data that will be entered into the predictive model and the desired predictive output, respectively. The amount of training data that may be required to train a predictive model can be large, e.g., in the order of gigabytes or terabytes. The number of different types of predictive models available is extensive, and different models behave differently depending on the type of input data. Additionally, a particular type of predictive model can be made to behave differently, for example, by adjusting the hyper-parameters or via feature induction or selection.

SUMMARY

In various implementations, predictive models can be imported into a system that selects implementations for the models based on factors such as a user's status, for instance. Different model implementations of a particular model (e.g., a Naive Bayes classifier) vary in the amount of parallelization they can achieve. Larger model implementations can utilize a large number of servers, for example. Model implementations can be associated with nodes in a graph so that the output of one model serves as the input to another. The order of model implementation execution is prescribed by the graph and, depending on the edges the graph, may allow some models implementations to be executed in parallel with each other.

In various implementations, predictive models can be imported into a system that selects implementations for the models based on factors such as a user's status, for instance. Different model implementations of a particular model (e.g., a Naive Bayes classifier) vary in the amount of parallelization they can achieve. Larger model implementations can utilize a large number of servers, for example. Model implementations can be associated with nodes in a graph so that the output of one model serves as the input to another. The order of model implementation execution is prescribed by the graph and, depending on the edges the graph, may allow some models implementations to be executed in parallel with each other.

In general, one innovative aspect of the subject matter described in this specification can be embodied in methods that include the actions of obtaining a plurality of model representations of predictive models, wherein each model representation is associated with a respective user and expresses a respective predictive model, and selecting a model implementation for each of the model representations, each model implementation comprising one or more computer programs operable to be executed on one or more computing devices, each model implementation being selected for a corresponding model representation based on one or more system usage properties associated with the user associated with the corresponding model representation, wherein the one or more system usage properties comprise one or more of the following: (i) an amount of system resources that the user has consumed over a given period of time, (ii) a time of day during which system resources were previously used by the user, or (iii) an amount of money that was previously paid by the user for the system resources.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination.

The method further includes associating each of one or more of the selected model implementations with a node in a directed graph, wherein for one or more ordered pairs of nodes in the graph the prediction output of a model implementation associated with a tail node in the pair serves as input to a model implementation associated with a head node in the pair. The method further includes executing each model implementation in an order prescribed by the directed graph. The method further includes assigning a system resources quota to the user; determining the amount of system resources that the user has consumed over the given period of time, and selecting the model implementation based on an amount of unconsumed system resources according to the system resource quota, wherein an amount of system resources that can be consumed by the selected model implementation does not exceed the amount of unconsumed system resources. The method further includes selecting a computationally-intensive model implementation for each of the model representations based on a determination that the system resources were previously used during an off-peak time of day. The method further includes determining an account balance for the user based on the amount of money that was previously paid by the user for the system resources, and selecting the model implementation based on the account balance, wherein an estimated amount of money that the user can be charged for the use of the selected model implementation does not result in a negative account balance.

Particular embodiments of the subject matter described in this specification can be implemented so as to realize one or more of the following advantages. Predictive models can be trained in third party systems and imported for use in systems described herein. Model implementations can be selected based user properties, available resources, other information, or combinations of these. Model implementations can be executed in concert with each other based on the order prescribed by a directed graph. This allows the prediction output of some models to serve as the input to other models. For example, a model that determines the sentiment of an article can provide a prediction of the sentiment to another model that predicts who the author of the document is.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
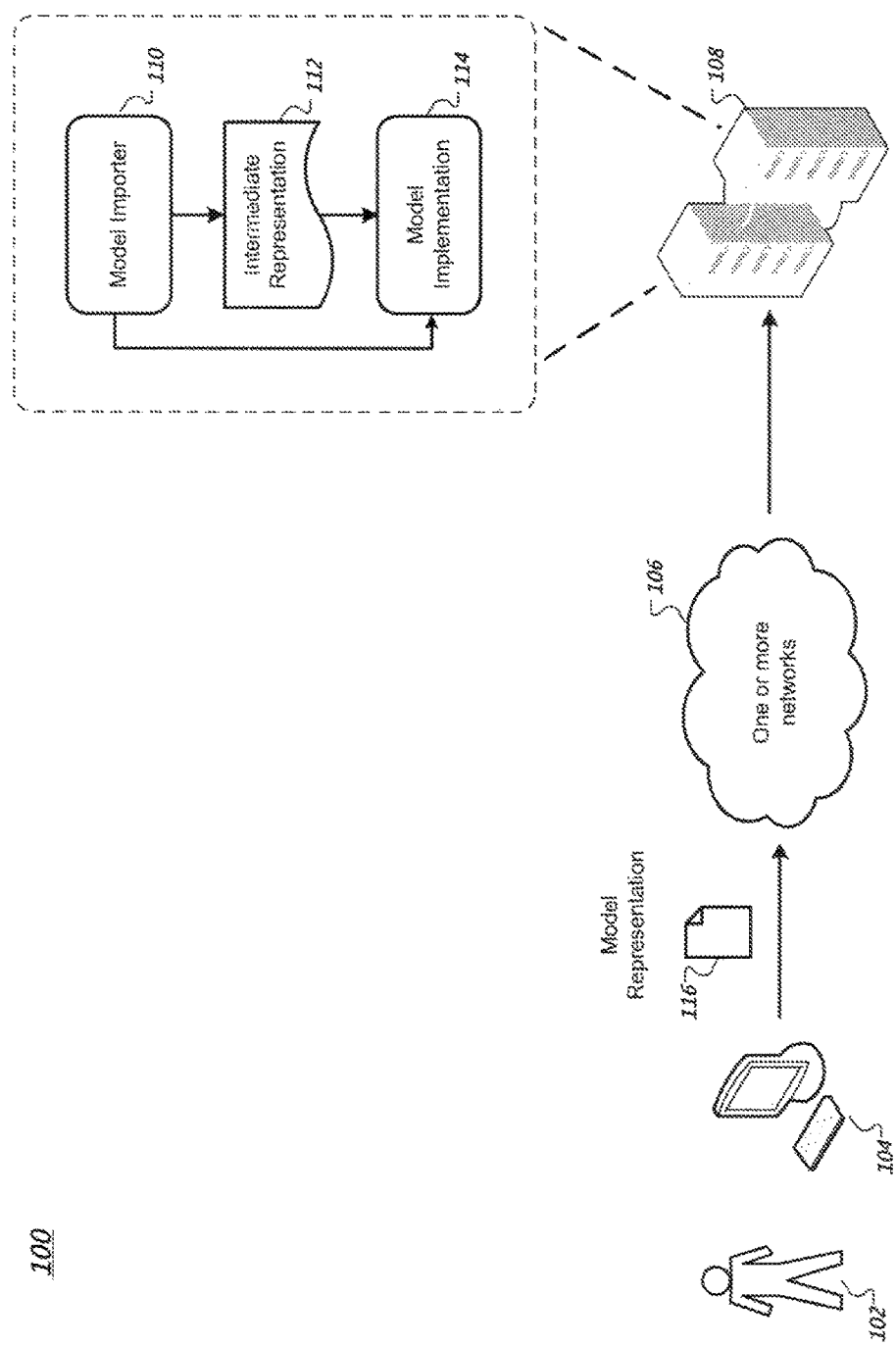
FIG. 1 illustrates the importation of a predictive model into an example system.

In various implementations, a predictive model (or "model") is either a categorical model if its predictions are categories, or is a regression model if its predictions are numeric. A predictive model is trained using training data. Training data encompasses examples that each comprise one or more data fields plus an answer (a category or a numeric value) for that example. By way of illustration, the training data in TABLE 1 consists of examples that are email message subject lines and a category that indicates whether each example represents SPAM or not.

TABLE 1

| EMAIL SUBJECT LINE | ANSWER |
| --- | --- |
| "You have won $$$" | "spam" |
| "Lose weight fast!" | "spam" |
| "Lowest interest rates ever!" | "spam" |
| "How are you?" | "not spam" |
| "Trip to New York" | "not spam" |

After a model has been trained against training data, queries can be submitted to the model. In some implementations, queries are similar in form to training examples: that is, a query has the same or fewer data fields but does not include the answer. The trained model uses patterns that it learned from the training data to either find the closest category for the submitted query (if it is a categorical model) or estimate a value for the query (if it is a regression model), and returns the category or value.

A model can be expressed as a model representation to allow models to be exchanged between systems. In some implementations, the model representation is a Predictive Model Markup Language (PMML) document. PMML is an eXtensible Markup Language (XML)-based language. Other model representations are possible such as, for example, formatted or unformatted text, an database (e.g., an SQL database), or a sparse vector. The PMML specification is an XML schema. Instances of models are XML documents that conform to the schema. A PMML document can represent more than one model. Generally speaking, a PMML document can contain some or all of the information described in TABLE 2. The PMML document can also contain information not described in TABLE 2.

TABLE 2

| SECTION | DESCRIPTION |
| --- | --- |
| Header | The header contains general information about the PMML document, such as copyright information for the model, its description, and information about the application used to generate the model. |
| Data Dictionary | The data dictionary contains definitions for all the possible fields used by the model. |
| Data Transformations | The data transformations specify mappings of user data into different forms to be used by the model. |
| Model | Contains the definition of the particular model. |
| Mining Schema | The mining schema lists all fields used in the model. This can be a subset of the fields as defined in the data dictionary. It contains specific information about each field, such as the field's name and what should happened when there is a missing value. |
| Targets | Targets specify post-processing for the predicted value. |
| Output | The output provides a name any output fields expected from the model, including the predicted value. |

FIG. 1 illustrates the importation of a predictive model into an example system 100. A user 102 interacts with a client computing device 104 (or "client") to access a model importer 110 web application for importing a model representation 116. A web application executes on one or more server computing devices (or "servers") that are accessed over a network 106, such as the Internet, by the user 102. Software that implements the model importer 110 executes on one or more servers in a data warehouse 108, for instance, that houses hundreds or thousands of servers. The user 102 can interact with the model importer 110 by using a web browser or other software that executes on the client 104. User data files such as model representations (e.g., model representation 116) that are accessed, modified or created by the model importer 110 can be stored in repositories that are accessible to the servers. The model importer 110 can provide a graphical user interface (GUI) to the client 104 by sending the client 104 Hypertext Markup Language (HTML) documents or other information that can be used to render the GUI.

The model importer 110 interprets the model representation 116 and either emits a intermediate representation 112 or a model implementation 114. By way of illustration, if the model representation 116 is a PMML document, an XML parser can be used to translate the document into the intermediate representation 112. The intermediate representation 112 is an internal representation of the model representation 116 from which a model implementation 114 can be generated or selected (if the implementation has already been generated). In some implementations, the intermediate representation 112 is a data structure that encodes the information of the model representation 116 to allow for rapid generation or selection of a model implementation 114.

A model implementation 114 can be generated or selected directly from the model representation 116 or from the intermediate representation 112. The model implementation 114 is one or more computer programs that execute on one or more servers. In some implementations, the type of model implementation 114 is chosen based on the user's status, available resources, or both. This is described further below with reference to FIG. 2. For example, the model implementation can be a computer program that is designed to execute on a single server or it can be designed to execute on multiple servers. An example of the later approach is a model implemented as a map-reduce system. A map-reduce system includes application-independent map modules configured to read input data and to apply at least one application-specific map operation to the input data to produce intermediate data values. The map operation is automatically parallelized across multiple servers. Intermediate data structures are used to store the intermediate data values. Application-independent reduce modules are configured to retrieve the intermediate data values and to apply at least one application-specific reduce operation to the intermediate data values to provide output data. The map-reduce system is described further in U.S. Pat. No. 7,650,331, entitled "System and method for efficient large-scale data processing," which is incorporated by reference herein in its entirety.

Figure 2:
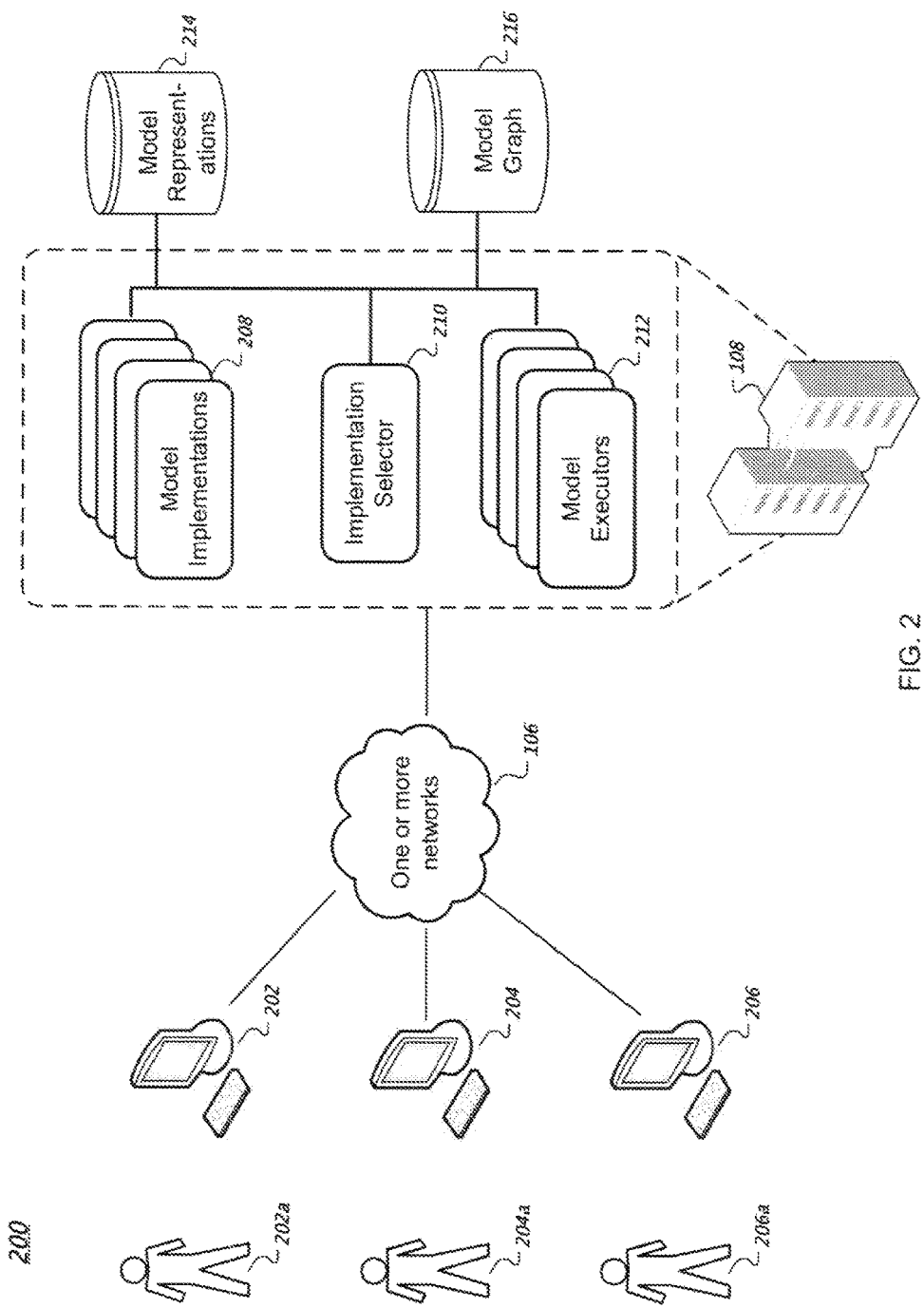
FIG. 2 illustrates an example predictive modeling system.

FIG. 2 illustrates an example predictive modeling system 200. The system 200 includes one or more clients (clients 202, 204 and 206) that can communicate through one or more networks 106 with a collection of remote servers, such as servers deployed in a data center 108 or in different geographic locations. A given server comprises one or more data processing apparatus. The servers can communicate with each other and with storage systems (e.g., model representation storage system 214 and model graph storage system 216) at various times using one or more computer networks or other communication means. For example, the servers in the data center 108 can be coupled to an intranet. A computer program can execute on a single server or, alternatively, the program can be organized into components that execute on multiple servers. There can be more than one instance or copy of a given computer program executing on the collection of servers at any given time. Multiple copies of a computer program that implements a model implementation or a model executor, for instance, can be executing at the same time on one or more servers.

Computer programs can be executed in parallel by the servers. Two computer programs are executed in parallel if they are executed on different servers and if at least a portion of their execution occurs at the same time. For example, assume that computer program A is executed on server S1 and computer program B is executed on server S2. If some period of time exists where program A and B are both being executed, then the programs are executed in parallel.

The servers execute computer programs that implement model implementations 208, an implementation selector 210, and model executors 212. The model executors 212 can use the implementation selector 210 to select model implementations 208 to execute based on various factors. A given model (e.g., a support vector machine) can have a number of different possible model implementations. In some implementations, there are predetermined model implementations. For example, there can be small, medium and large implementations. A small model implementation uses the resources of a single server, a medium model implementation has a parallelized implementation (e.g., a map-reduce model implementation) that uses the resources of N servers, and a large implementation has a parallelized implementation that uses the resources of P servers, where P>N. Of course, P and N can be varied dynamically based on the available resources of the system 200 (e.g., the number of a servers that are available to execute a portion of the model implementation) and other factors. Some model implementations can also perform pre-processing (see "data transformations" in TABLE 2) and post-processing (see "targets" in TABLE 2) in parallel. Model training and prediction can be performed faster on models implementations that utilize more servers those that utilize fewer. In some implementations the user can choose which model implementation they desire.

The implementation selector 210 is used by the predictive model importer 110 (FIG. 1) or by the model executors 212 to select a specific implementation for an imported model representation based on user properties, available resources, other information, or combinations of these. (Model executors 212 are described further below.) One user property is a user's status. Users (e.g., users 202a, 204a, and 206a) can each be associated with a respective status to indicate the type of user they are such as, for example, "very important user", "test user", and so on. Other types of user status are possible. A model implementation can be selected based on the user's status. Users who are very important, for instance, can be assigned a model implementation that executes faster than model implementations for test users. In various implementations, larger model implementations (e.g., medium or large) are selected for very important users whereas smaller model implementations (e.g., small) are selected for users of lesser status.

Other user properties are the amount of system 200 resources the user has consumed over a given time period, the time of day the user typically trains or queries their models, and the amount of money the user has paid to utilize the system 200. The amount of resources consumed can be—for one or more servers—the amount of computer memory consumed, the amount of CPU processing time consumed, the amount of information sent or received on a computer network, or combinations of these. In some implementations, users are assigned resource quotas and model implementations are selected based the amount of unused resources according to the user's quota. For example, a user may configure the system to provide the fastest model implementation that is estimated not to exceed the user's unused resource quota.

The time of day that a user typically trains or queries their models can, in some implementations, determine the speed of the model implementation used. During off peak hours faster and/or more computationally-intensive model implementations can be used, for example. The amount of money a user has paid to utilize the system 200 can be a flat rate, or based on actual usage. In the former case, the user may pay for a level or grade of service which determines the size of model implementations that are available to them. In the latter case, the user is charged for the system 200 resources they consume so that if the user (or the system 200) selects larger model implementations, the user will be charged accordingly. In some implementations, the user's remaining account balance determines which model implementations are selected based on an estimate of what the user will be charged for the usage. That is, the most accurate and fastest model implementation possible is selected that is not estimated to result in a negative account balance based on system 200 usage.

Figure 3:
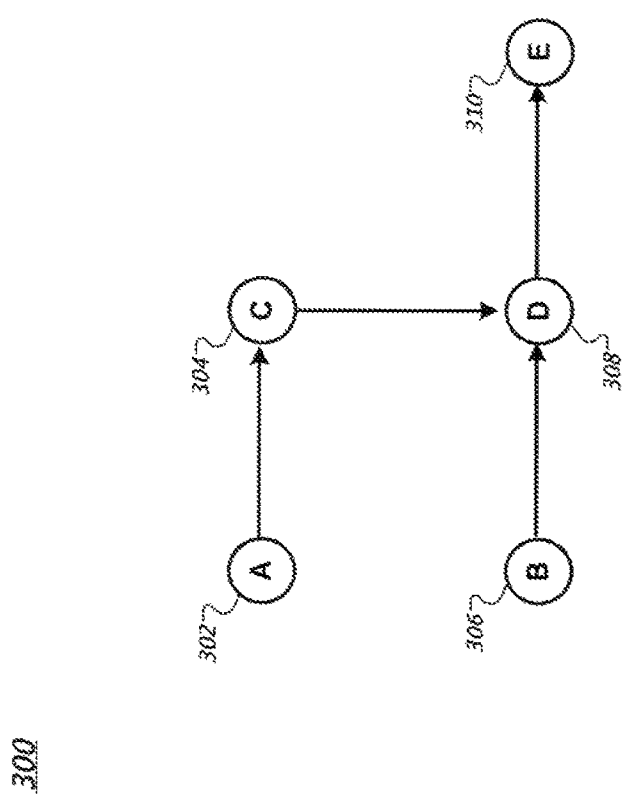
FIG. 3 illustrates an example directed graph for use in executing predictive models.

The model executors 212 execute the model implementations according to an order prescribed by respective directed graphs assigned to the model executors 212. A directed graph or digraph is a pair G=(V, E) where V is a set nodes and E is a set of ordered pairs of nodes or "edges". An edge e=(x, y) is considered to be directed from node x to node y; y is called the head and x is called the tail of the edge; y is said to be a direct successor of x, and x is said to be a direct predecessor of y. If a path made up of one or more successive edges leads from x to y, then y is said to be a successor of x, and x is said to be a predecessor of y. FIG. 3 illustrates an example directed graph 300 for use in executing predictive models. The graph 300 contains nodes A 302, B 306, C 304, D 308 and E 310. The edges of the graph 300 are indicated by directed lines between nodes and are as follows: (A, C), (B, D), (C, D), and (D, E).

In various implementations, each node of the graph 300 is associated with a model implementation. A model executor executes model implementations by following the edges in the graph 300. The prediction output of a model implementation associated with a direct predecessor serves as input to the model implementation associated with the direct successor. In this example, the output of the model implementation associated with node A 302 serves as input to the model implementation associated with node C 304. The input to the model implementation associated with node D 308 is the output of the model implementations associated with nodes C 304 and B 306. The output of the model implementation associated with node D 308 serves as input to the model implementation associated with node E 310. The model executor can utilize dependencies in the graph to determine if model implementations can be executed in parallel. For example, the execution of the model implementation associated with node B 306 can occur in parallel with the execution of the model implementations associated with nodes A 302 and C 304 since there are no edges between A 302 and B 306, and between C 304 and B 306.

Figure 4:
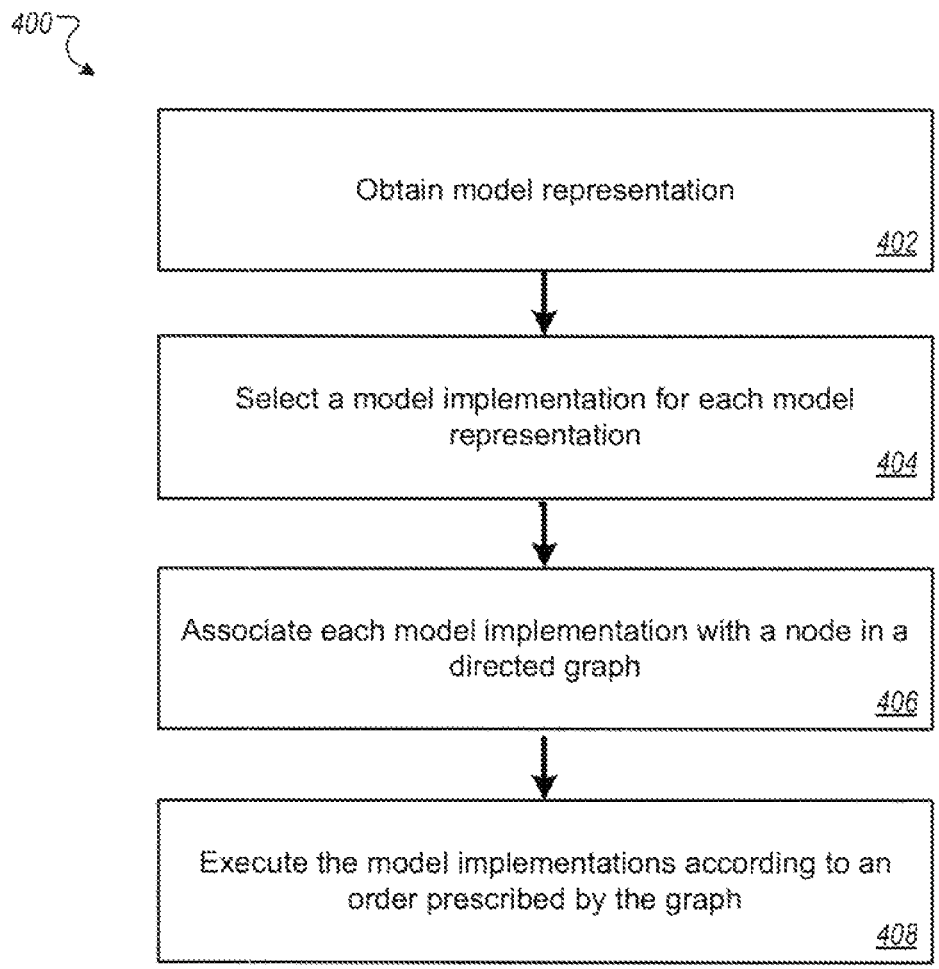
FIG. 4 is a flowchart of an example process for executing predictive models.

FIG. 4 is a flowchart of an example process 400 for executing predictive models. Representations (e.g., model representation 116) of predictive models are obtained from clients (e.g., clients 202, 204 and 206) by, for example, the model importer 110 (step 402). Each representation is associated with a user (e.g., users 202a, 204a, and 206a) and comprises a description of a respective predictive model, such as a PMML document. A model implementation is selected for each of the model representations (e.g., by the implementation selector 220; step 404). The model implementations can be selected based on a status of the associated user, for example, or other properties. Each model implementation is associated with a node in a graph, such as graph 300 (step 406). The model implementations are then executed by the model executor 212, for example, in the order prescribed by the graph (step 408).

Figure 5:
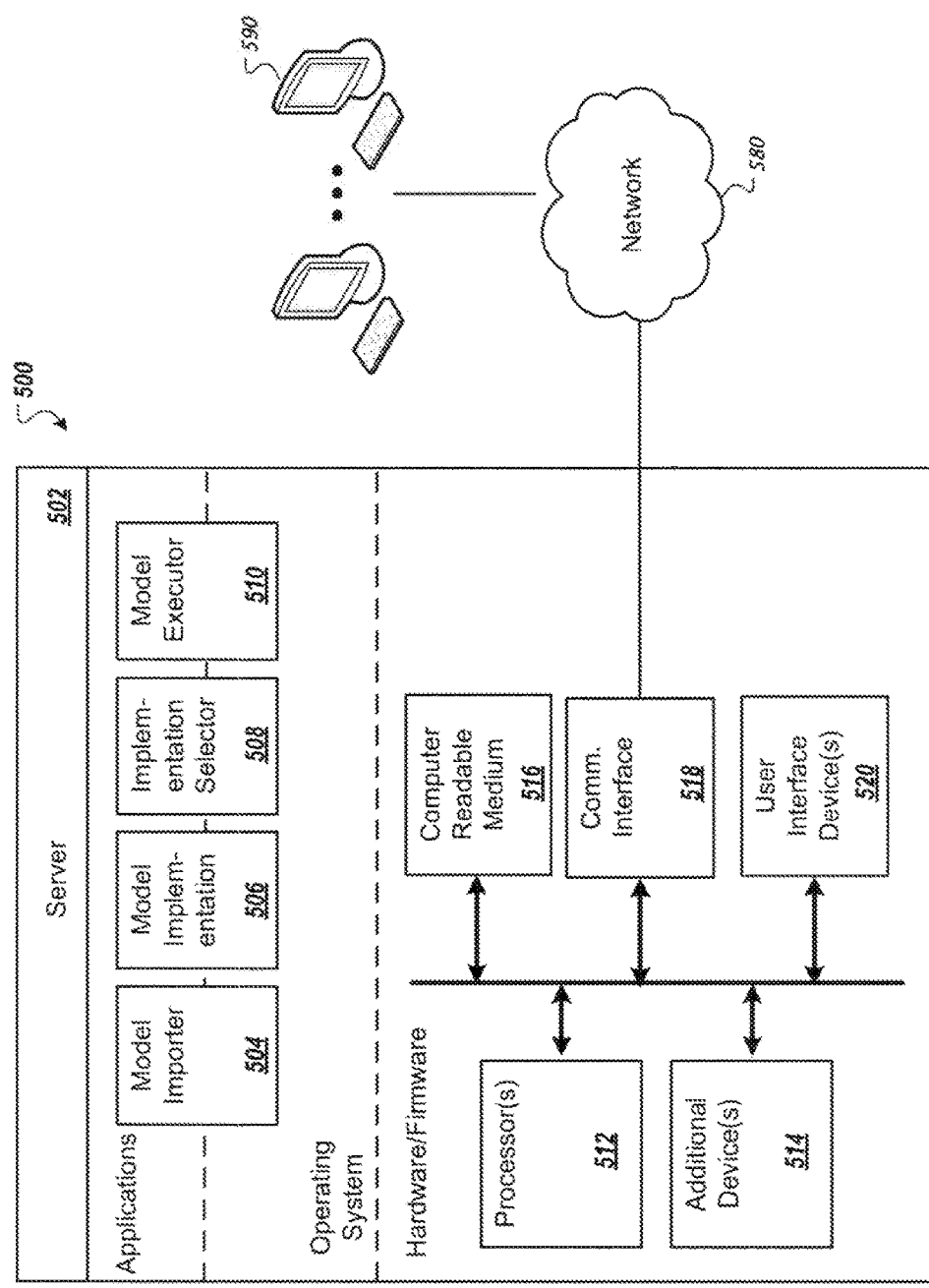
FIG. 5 is a schematic diagram of an example server.

FIG. 5 is a schematic diagram of an example server. The server 502 is optionally connected to one or more user or client computers 590 through a network 580. The server 502 consists of one or more data processing apparatuses. While only one data processing apparatus is shown in FIG. 5, multiple data processing apparatus can be used. The server 502 includes various software modules, e.g. executable software programs or libraries, including one or more of: a model importer 504, a model implementation 506, an implementation selector 508, and a model executer 510. Although several software modules are illustrated, there may be fewer or more software modules. Moreover, the software modules can be distributed on one or more data processing apparatus connected by one or more networks or other suitable communication mediums.

The server 502 also includes hardware or firmware devices including one or more processors 512, one or more additional devices 514, a computer readable medium 516, a communication interface 518, and one or more user interface devices 520. Each processor 512 is capable of processing instructions for execution within the server 502. In some implementations, the processor 512 is a single or multi-threaded processor. Each processor 512 is capable of processing instructions stored on the computer readable medium 516 or on a storage device such as one of the additional devices 514. The server 502 uses its communication interface 518 to communicate with one or more computers 590, for example, over a network 580. Examples of user interface devices 520 include a display, a camera, a speaker, a microphone, a tactile feedback device, a keyboard, and a mouse. The server 502 can store instructions that implement operations associated with the modules described above, for example, on the computer readable medium 516 or one or more additional devices 514, for example, one or more of a floppy disk device, a hard disk device, an optical disk device, or a tape device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, the method comprising:
    for each representation of a plurality of representations of predictive models, selecting a model implementation from a plurality of model implementation for the representation, wherein each representation is associated with a respective user and comprises a description of a respective predictive model, the selection based on a status of the representation's respective user;
    associating each of the model implementations with a respective node in a directed graph wherein for one or more ordered pairs of nodes in the graph the prediction output of a model implementation associated with a first node in the pair serves as input to a model implementation associated with a second node in the pair;
    determining, from the directed graph, a subset of model implementations that can be executed in parallel based on edge dependencies in the directed graph; and
    causing the models in the subset of model implementations to be executed in parallel.

2. The computer-implemented method of claim 1, wherein for one or more ordered pairs of nodes in the graph the prediction output of a model implementation associated with a tail node in the pair serves as input to a model implementation associated with a head node in the pair.

3. The computer-implemented method of claim 1, further comprising:
    assigning a system resource quota to at least one respective user;
    determining an amount of system resources that the model implementations for the respective user have consumed over a given period of time; and
    selecting the model implementation based on an amount of unconsumed system resources
according to the system resource quota, wherein an amount of system resources that can be consumed by the selected model implementation does not exceed the amount of unconsumed system resources.

4. The computer-implemented method of claim 1, further comprising:
    selecting a computationally-intensive model implementation for the model representation based on a determination that system resources were previously used during an off-peak time of day.

5. The computer-implemented method of claim 1, wherein:
    for at least a first node in the directed graph the node is realized by special purpose circuitry, and a model implementation associated with the first node is configured to be executed by the special purpose circuitry; and
    for at least a second node in the directed graph the node is realized by a general purpose microprocessor, and a model implementation associated with the second node is configured to be executed by the general purpose microprocessor.

6. The computer-implemented method of claim 5, wherein the special purpose circuitry is an ASIC.

7. A computer-implemented method, the method comprising:
    for each representation of a plurality of representations of predictive models, selecting a model implementation from a plurality of model implementation for the representation, wherein each representation comprises a description of a respective predictive model;
    associating each of the model implementations with a respective node in a directed graph wherein for one or more ordered pairs of nodes in the graph the prediction output of a model implementation associated with a first node in the pair serves as input to a model implementation associated with a second node in the pair, wherein:
        for at least a first node in the directed graph the node is realized by special purpose circuitry, and a model implementation associated with the first node and configured to be executed by the special purpose circuitry is selected for the first node based on its configuration to be executed by the special purpose circuitry; and
        for at least a second node in the directed graph the node is realized by a general purpose microprocessor, and a model implementation associated with the second node and configured to be executed by the general purpose microprocessor is selected for the second node based on its configuration to be executed by the general purpose microprocessor.

8. The computer-implemented method of claim 7, further comprising:
    determining, from the directed graph, a subset of model implementations that can be executed in parallel based on edge dependencies in the directed graph; and
    causing the models in the subset of model implementations to be executed in parallel.

9. The computer-implemented method of claim 8, wherein for one or more ordered pairs of nodes in the graph the prediction output of a model implementation associated with a tail node in the pair serves as input to a model implementation associated with a head node in the pair.

10. The computer-implemented method of claim 7, further comprising:
    assigning a system resource quota to a user associated with a representation;
    determining an amount of system resources that model implementations for the respective user have consumed over a given period of time; and
    selecting the model implementation based on an amount of unconsumed system resources
according to the system resource quota, wherein an amount of system resources that can be consumed by the selected model implementation does not exceed the amount of unconsumed system resources.

11. The computer-implemented method of claim 7, wherein the special purpose circuitry is an ASIC.

12. A system, comprising:
a plurality of processing devices in data communication, wherein the processing devices are operable to perform operations comprising:
for each representation of a plurality of representations of predictive models, selecting a model implementation from a plurality of model implementation for the representation, wherein each representation is associated with a respective user and comprises a description of a respective predictive model, the selection based on a status of the representation's respective user;
associating each of the model implementations with a respective node in a directed graph wherein for one or more ordered pairs of nodes in the graph the prediction output of a model implementation associated with a first node in the pair serves as input to a model implementation associated with a second node in the pair;
determining, from the directed graph, a subset of model implementations that can be executed in parallel based on edge dependencies in the directed graph; and
causing the models in the subset of model implementations to be executed in parallel.

13. The system of claim 11, wherein for one or more ordered pairs of nodes in the graph the prediction output of a model implementation associated with a tail node in the pair serves as input to a model implementation associated with a head node in the pair.

14. The system of claim 12, the operations further comprising:
assigning a system resource quota to at least one respective user;
determining an amount of system resources that the model implementations for the respective user have consumed over a given period of time; and
selecting the model implementation based on an amount of unconsumed system resources
according to the system resource quota, wherein an amount of system resources that can be consumed by the selected model implementation does not exceed the amount of unconsumed
system resources.

15. The system of claim 12, the operations further comprising:
selecting a computationally-intensive model implementation for the model representation based on a determination that system resources were previously used during an off-peak time of day.

16. The system of claim 12, wherein:
for at least a first node in the directed graph the system realizes the node by special purpose circuitry, and a model implementation associated with the first node is configured to be executed by the special purpose circuitry; and
for at least a second node in the directed graph system realizes the node by a general purpose microprocessor, and a model implementation associated with the second node is configured to be executed by the general purpose microprocessor.

17. The computer-implemented method of claim 16, wherein the special purpose circuitry is an ASIC.

18. A system, comprising:
a plurality of processing devices in data communication, wherein the processing devices are operable to:
for each representation of a plurality of representations of predictive models, selecting a model implementation from a plurality of model implementation for the representation, wherein each representation comprises a description of a respective predictive model;
associating each of the model implementations with a respective node in a directed graph wherein for one or more ordered pairs of nodes in the graph the prediction output of a model implementation associated with a first node in the pair serves as input to a model implementation associated with a second node in the pair, wherein:
for at least a first node in the directed graph the system realizes the node by special purpose circuitry, and a model implementation associated with the first node and configured to be executed by the special purpose circuitry is selected for the first node based on its configuration to be executed by the special purpose circuitry; and
for at least a second node in the directed graph the system realizes the node by a general purpose microprocessor, and a model implementation associated with the second node and configured to be executed by the general purpose microprocessor is selected for the second node based on its configuration to be executed by the general purpose microprocessor.

19. The system of claim 18, further comprising:
determining, from the directed graph, a subset of model implementations that can be executed in parallel based on edge dependencies in the directed graph; and
causing the models in the subset of model implementations to be executed in parallel.

20. The system of claim 19, wherein for one or more ordered pairs of nodes in the graph the prediction output of a model implementation associated with a tail node in the pair serves as input to a model implementation associated with a head node in the pair.

21. The system of claim 18, further comprising:
assigning a system resource quota to a user associated with a representation;
determining an amount of system resources that model implementations for the respective user have consumed over a given period of time; and
selecting the model implementation based on an amount of unconsumed system resources
according to the system resource quota, wherein an amount of system resources that can be consumed by the selected model implementation does not exceed the amount of unconsumed system resources.

22. The system of claim 18, wherein the special purpose circuitry is an ASIC.

* * * * *